United States Patent [19]

Chiron

[11] 4,147,488
[45] Apr. 3, 1979

[54] HIGH FREQUENCY APPARATUS FOR FORMING STRUCTURAL SHAPES

[75] Inventor: Georges Chiron, Chambery, France

[73] Assignee: Saint-Gobain Industries, Neuilly-sur-Seine, France

[21] Appl. No.: 789,221

[22] Filed: Apr. 20, 1977

[30] Foreign Application Priority Data

Apr. 21, 1976 [FR] France .................. 76 11687

[51] Int. Cl.² .................................... B29C 25/00
[52] U.S. Cl. .................... 425/174.8 E; 219/10.81;
264/26; 264/137; 425/93; 425/383; 425/404;
425/446; 425/DIG. 13
[58] Field of Search ............ 219/10.81; 264/136,
264/137, 25, 26; 432/8; 425/174.8 R, 174.8 E,
93, 505, 515, 383, 404, 445, 446, DIG. 13, DIG.
38; 249/78

[56] References Cited
U.S. PATENT DOCUMENTS

| | | | |
|---|---|---|---|
| 2,303,341 | 12/1942 | Dufour et al. | 425/174.8 R X |
| 3,501,562 | 3/1970 | Onoyama et al. | 264/137 |
| 3,532,848 | 10/1970 | Loring, Jr. et al. | 219/10.81 X |
| 3,701,875 | 10/1972 | Witsey et al. | 219/10.81 |

OTHER PUBLICATIONS

*Industrial High Frequency Electrical Power*, May, E. 1949, "Stub Matching", pp. 245–247.

*Primary Examiner*—Richard B. Lazarus
*Assistant Examiner*—Mark Rosenbaum
*Attorney, Agent, or Firm*—John T. Synnestvedt; M. Richard Page

[57] ABSTRACT

Apparatus and method for the continuous manufacture of structural shapes are disclosed. Mineral fiber material in the form of continuous strands, webs, or mats, impregnated with a heat-hardenable resin, is passed through a dielectric heater. The material is shaped as it passes through metallic dies that are disposed within the dielectric heater. The electric field between the electrodes of the heater is reduced or shunted at the location of the dies. The heater is arranged so that the maximum electrical field occurs adjacent the entrance to the heater.

15 Claims, 13 Drawing Figures

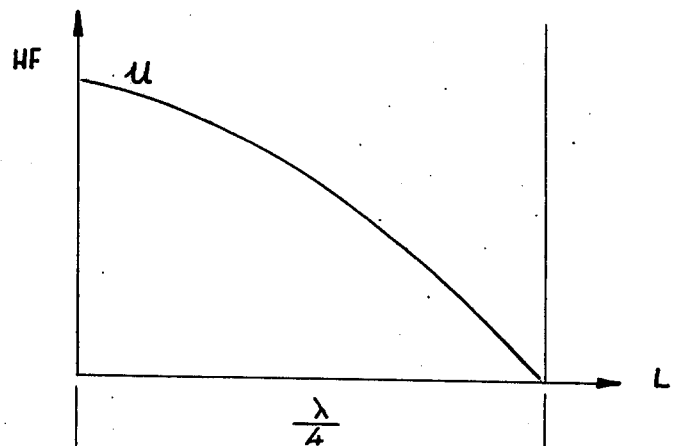
FIG: 1
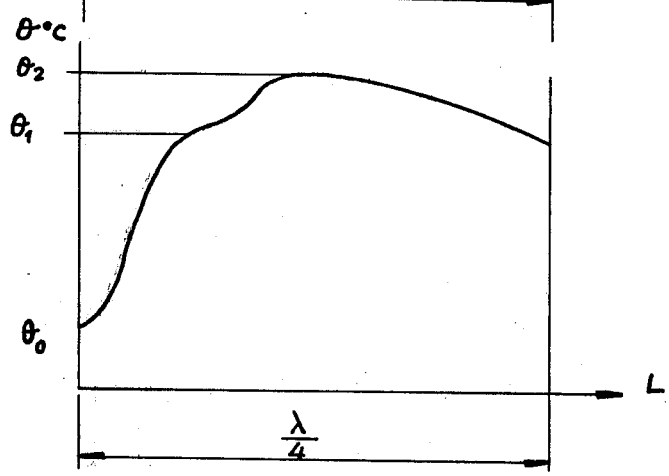
FIG: 2
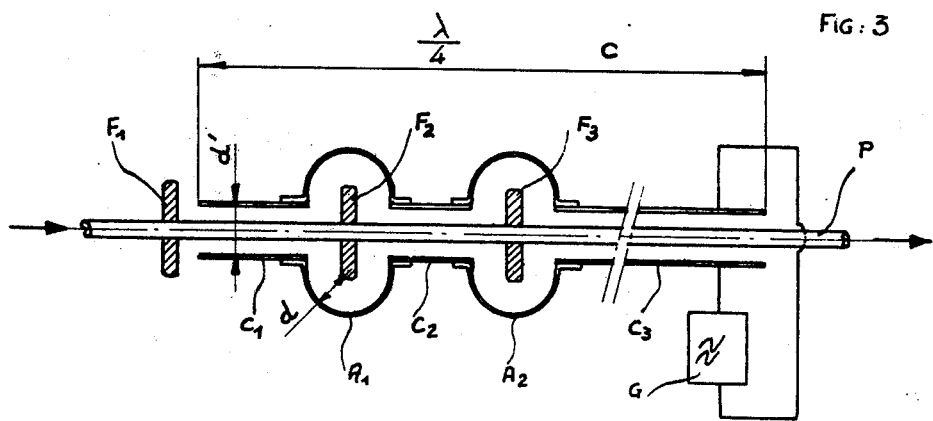
FIG: 3

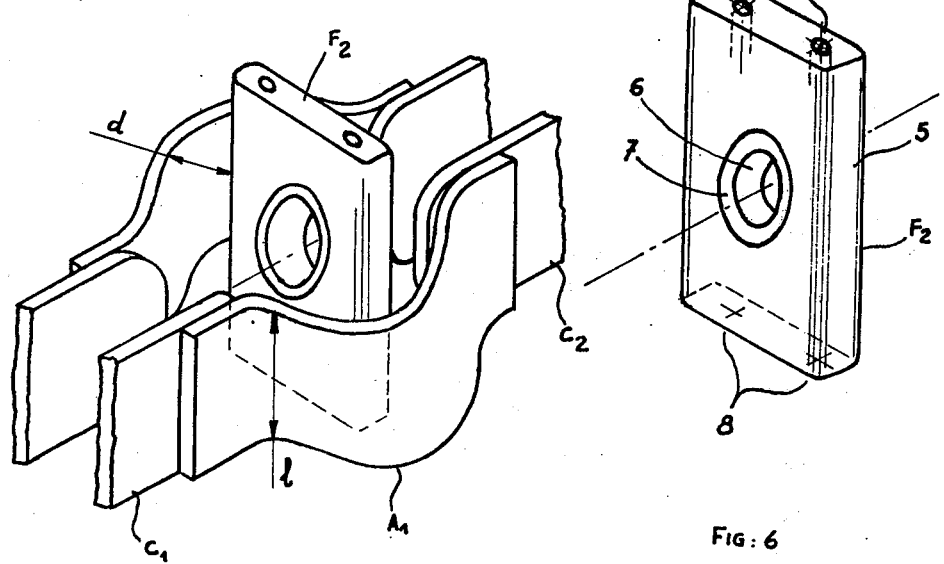
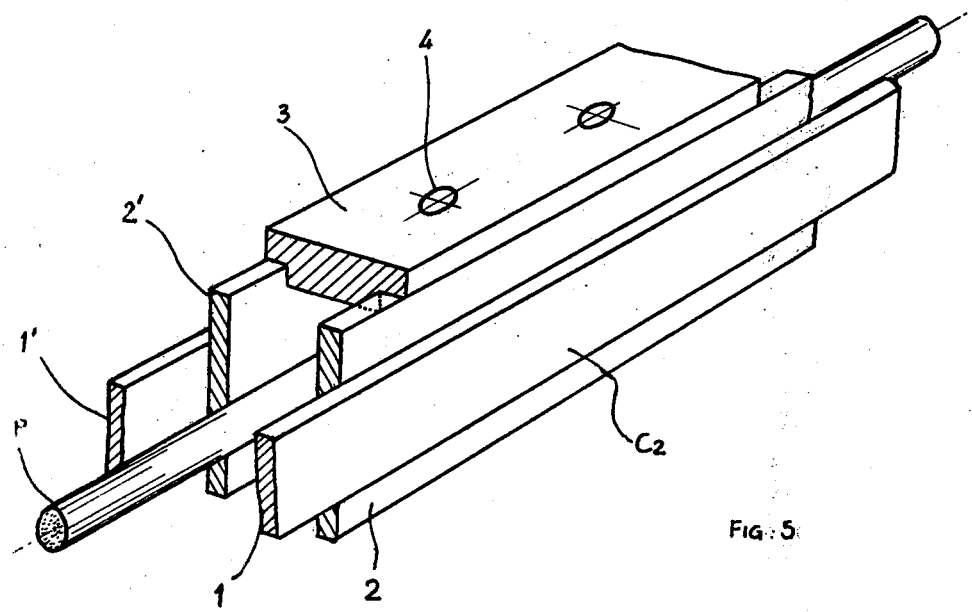

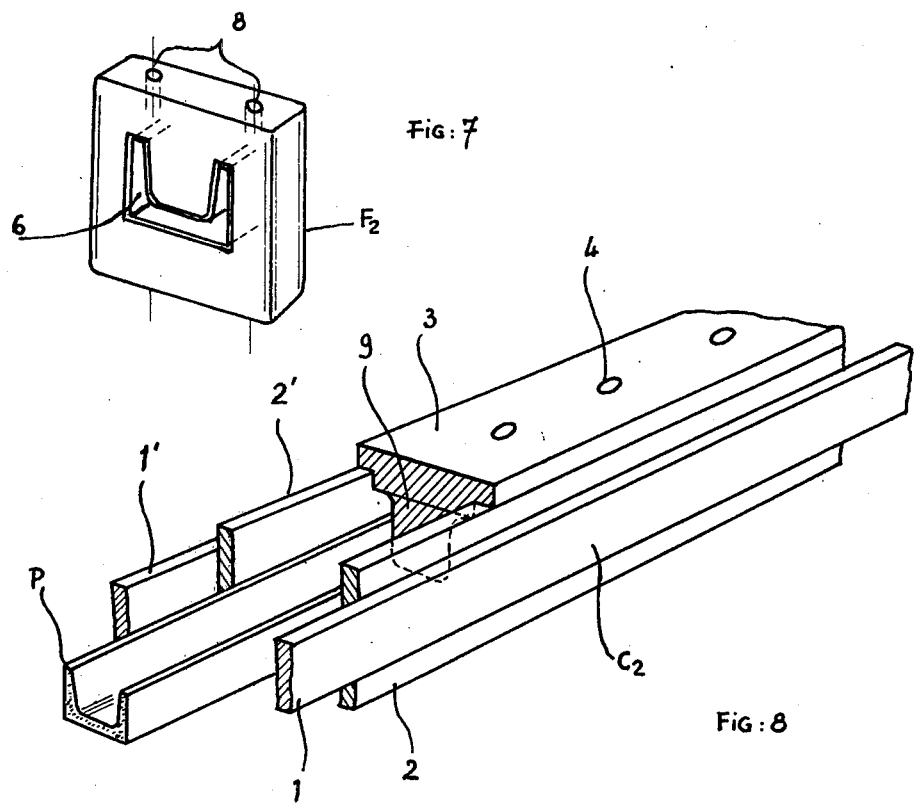
FIG: 7
FIG: 8
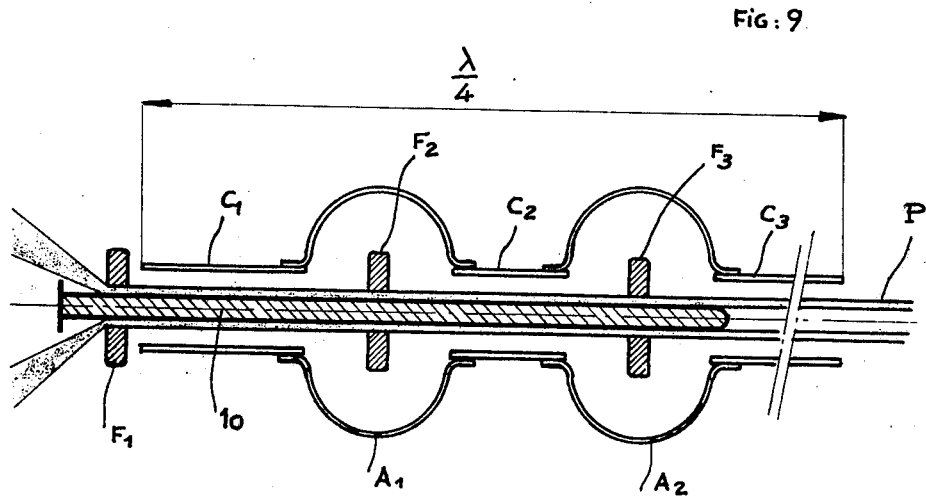
FIG: 9

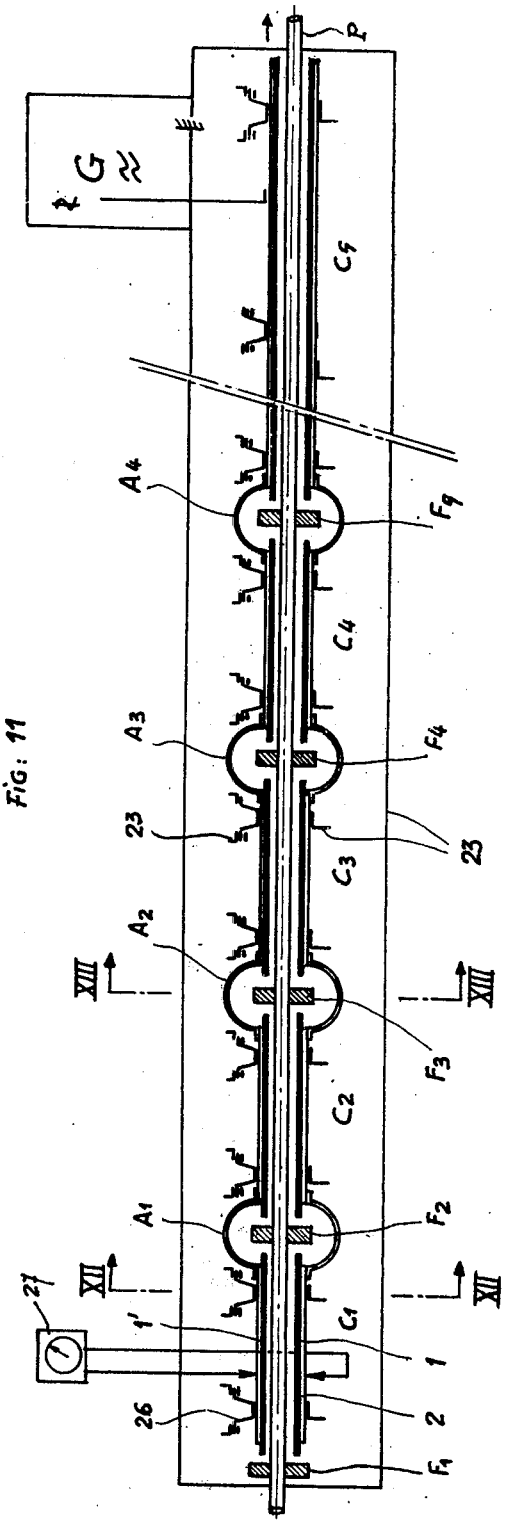
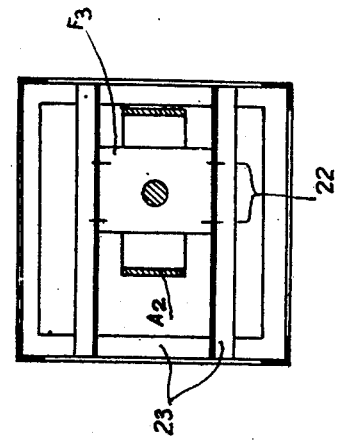
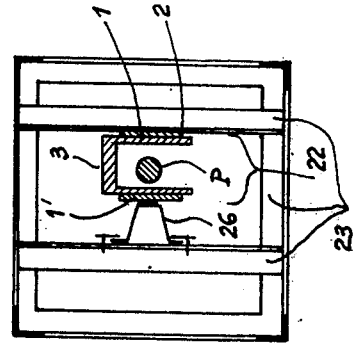

HIGH FREQUENCY APPARATUS FOR FORMING STRUCTURAL SHAPES

BACKGROUND OF THE INVENTION

This invention relates to the continuous manufacture of structural shapes, particularly from heat-hardenable resins that are reinforced with continuous strands, webs, or mats of mineral fibers, particularly glass fibers.

It is known to produce structural shapes from fiber reinforced resins by drawing a length of resin-impregnated mineral fiber material through a fluid- or electrically-heated die. The die raises the temperature of the material and causes the resin to polymerize. In these arrangements, thermal transfer is accomplished by conduction as the material engages the surfaces of the die. This results in the polymerization of resin located at or near the exterior surfaces of the shape before polymerization of the resin in the interior of the shape; this can result in inducing internal cracking. In order for sufficient heat to be transferred to the material being processed under these arrangements, the operation must take place at relatively low speeds or very long dies must be used; either of these solutions has an adverse effect on the economics of the operation.

Dielectric heating of fiber-reinforced thermosetting resins is also known. Dielectric heating substantially eliminates the problem of internal cracking because the temperature of the resin is raised to the polymerization initiation point simultaneously throughout the cross-section of the shape being formed. However, known systems require the use of nonmetallic dies that are formed of a material having low dielectric loss. Polytetrafluoroethylene (PTFE) is a preferred material for this purpose. However, PTFE dies have the disadvantage that the die surface is quickly worn away, and this changes the dimensions of the die and results in difficulties in holding the tolerances of the shape being produced.

It has also been proposed to manufacture certain shapes by successively forming the resin impregnated material with the aid of rollers, which rollers also form the electrodes of a dielectric heating arrangement for providing heat to accelerate the polymerization of the resin. However, this method is disadvantageous because the heating occurs in short bursts, the variety of shapes that can be manufactured is limited, and operating speeds are low.

A two-stage method is also known. In this method, at a first stage, dielectric heating initiates the polymerization of the resin and, simultaneously, the forming of the shape by means of a die is effected. In this case, the die is of a material having a low dielectric loss. During the second stage, a final polymerization is carried out as the material passes through a metallic die, not subject to the influence of the electric field of the dielectric heater, but heated by conventional means. In certain cases, this final polymerization is completed as the material passes through an oven. The shaping and final hardening that takes place in the second stage requires a relatively long metallic die; this creates processing difficulties arising from the relatively high coefficient of friction between the die and the material being shaped and heated. In addition, this method requires the use of expensive dies and uneconomical dual heating arrangements having a heated forming die and a heated finishing die.

This invention does away with the above-noted disadvantages.

BRIEF DESCRIPTION OF THE INVENTION

In accordance with the invention, continuous strand, tissue, or mat of mineral fiber material, impregnated with thermo-setting resins, are passed through a forming apparatus and the heat necessary to initiate polymerization of the resin results from dielectrical loss as the material passes through the high-frequency electrical field of a dielectric heater.

According to the invention, the resin-impregnated material passes through a dielectric heater in which the electrical field is at a maximum at a point adjacent the entrance to the heater and the material, during its travel through the heater, is subjected to a succession of brief shaping steps, the electrical field being reduced or shunted while each shaping step takes place.

Contrary to prior techniques, all of the formation steps—polymerization, shaping, and final hardening of the impregnated material—are carried out within a dielectric heater without the need for dies formed of low dielectric loss materials, such as PTFE.

According to another aspect of the invention, the dielectric heater comprises an open, resonant line. The length of the electrodes is such that the distribution of electrical potential along the electrodes is in the form of a standing wave; the current is supplied to the electrodes so that the maximum potential occurs at the upstream end or at the entrance to the heater.

Preferably, the length of the electrodes corresponds to about one quarter the wavelength of the applied current.

The fact that polymerization, forming, and final hardening of the material take place prior to the material leaving the dielectric heater, eliminates the risk of deformation of the material at the outlet of the heater and eliminates the final shaping step found necessary in previous methods.

The invention also concerns apparatus for the continuous formation of structural shapes. The apparatus comprises a forming system having several short dies arranged in the interior of an open, resonant dielectric heating line. These dies can be made of any abrasion-resistant material and are preferably of an appropriate metal, for example steel.

According to another aspect of the invention, the dielectric heater comprises a series of electrode sections that are electrically connected by bridges that reduce or shunt the electric field. The short metallic dies are placed between electrode sections and are aligned with the bridges. By this arrangement, the metallic dies can be placed within the heater, without risk of electrical discharge (i.e., corona discharge) between the electrodes and the dies.

Another advantage of the system is that the impregnated material travels through the heater while being carried and formed by the series of short dies. Thus, the material does not rub against the walls of the heater and the spaces between dies can be lined with insulation.

The material to be shaped travels through a dielectric heater in which the electrical potential between electrodes diminishes from the entrance to the outlet, following the general outline of one quarter of a wave. The field undergoes several short disturbances, the disturbances occuring at the locations of the metallic dies, but retakes the general shape of one quarter of a wave between each die. Because the dies are short, the interruption in dielectric heating that results from the shunting of the electrical field in regions adjacent the dies is very short and there is little or no risk of slowing the polymerization reaction. For purposes of this disclosure, short dies are dies the lengths of which are sufficient to withstand the mechanical pulling forces transmitted to the die by the material that is being formed without, at the same time, risking disturbance of the stationary wave pattern existing in the heater.

As noted above, according to a preferred form of the invention, the total length of the dielectric heating cell is about one quarter the wavelength of the applied current. By supplying current to the line at the downstream end, it is possible to obtain a distribution of potential along the electrodes such that the maximum potential occurs at the entrance of the dielectric heater; thus the temperature of the resin-impregnated material is raised very rapidly into a zone at which accelerated polymerization is initiated. The decrease in electrical potential that occurs over the length of the heater results in a diminishing of the amount of energy imparted to the material but this is counterbalanced by the production of heat resulting from the exothermic polymerization reaction. The superposition of the two phenomena allow the polymerization to be maintained and result in a completely hardened structure leaving the outlet of the heater. Therefore, for each resin, it is easy to determine the speed of transport of material through the heater that yields the most favorable energy balance.

The rapid rise in temperature of the resin arises from the coincidence of two factors: the electrical field is at its maximum at the entrance to the heater and as the material enters the heater, its dielectric loss factor of the resin is also at a maximum because it is in its unpolymerized state. The loss factor decreases with time as the material advances through the heater because of the progressive polymerization of the resin.

It should be noted that use of very high temperatures can result in irregularities in the unpolymerized resin, and also creates very substantial stress at the glass-resin interface. The energy developed by dielectric loss in the material is proportional to the frequency of the current applied to the heater electrodes and this frequency is chosen in such a way, taking into account also the length of the heater, as to maintain the temperature of the material below the point at which these phenomena occur.

All thermo-setting resins having a sufficient dielectric loss can be polymerized by a heater having a one quarter wavelength and operating at resonance. When the electrodes are set at the optimum spacing that is imposed by the consideration of avoiding corona discharge, the speed of the material through the heater is the only variable that determines the degree of hardening of the resin as the material leaves the heater.

Although a heater in which the electrodes are a one quarter wavelength of the exitation current is a preferred form of the invention, this arrangement could impose a processing speed limitation that has an adverse effect on the profitability of the structure being produced. However, it is possible by using a heater of longer length, for example, $3\lambda/4$ to obtain a satisfactory balance of energy consumption versus processing speed.

In relation to methods requiring the use of long metallic dies or methods using dielectric heating with PTFE dies, the invention has the following advantages:
a lowering of the cost of the dies;
the possibility of producing profiles of complicated shapes;
an increase in the running time of the equipment between die changes; and
the improved utilization of energy.

The frequency range used is preferably between 1 and 100 MHz. However, it is convenient to use the frequencies authorized for industrial usage by the International Telecom Convention in Atlantic City and among these, the following are usable for dielectric heating:
13.56 MHz ± 0.05%
27.12 MHz ± 0.05%
40.68 MHz ± 0.05%

The wavelengths corresponding to these frequencies are approximately:
$\lambda \simeq 22$ m
$\lambda \simeq 11$ m
$\lambda \simeq 7.4$ m The use of these frequencies simplifies shielding requirements.

The electrodes of the heater form a capacitor through which the structure progresses during the course of polymerization. This capacitor can take different forms according to the profile of the structure being formed. It is desireable from the standpoint of efficiency, to operate the system at resonance and under this condition, the capacitance of the heater must satisfy the following relationship:

$$LC\omega^2 = 1$$

$L$ is the coefficient of self-induction of the generator in henrys, $C$ is the capacitance of heater electrodes in farads, and $\omega$ equals $2\pi F$, F being the working frequency of the generator.

In fact, the frequency of the generator is usually controllable and this allows a certain latitude in the choice of the capacitance and form of the heater electrodes.

DESCRIPTION OF PREFERRED EMBODIMENTS

FIG. 1 is a graph showing the relationship of the intensity of the electrical field with respect to distance in a one quarter wavelength heater.

FIG. 2 is a graph showing the relationship of the temperature of the material in relation to distance in a one quarter wavelength heater.

FIG. 3 is a schematic diagram of a heater according to the invention.

FIG. 4 is a perspective view showing bridges that connect electrode sections and that surround the dies.

FIG. 5 is a perspective view of a portion of a heater.

FIG. 6 is a perspective view of one embodiment of a die.

FIGS. 7 and 8 are perspective views of a die and a portion of the heater electrodes respectively for the manufacture of channel-type structures.

FIG. 9 is a cross-section of a heater used for manufacturing hollow structures.

FIG. 11 is a schematic, horizontal sectional view of the heater arrangement of FIG. 10.

FIGS. 12 and 13 are vertical sections taken along lines XII—XII and XIII—XIII respectively of FIG. 11.

In the following description, the same reference numerals are used in each figure to refer to the same elements.

Figure 10:
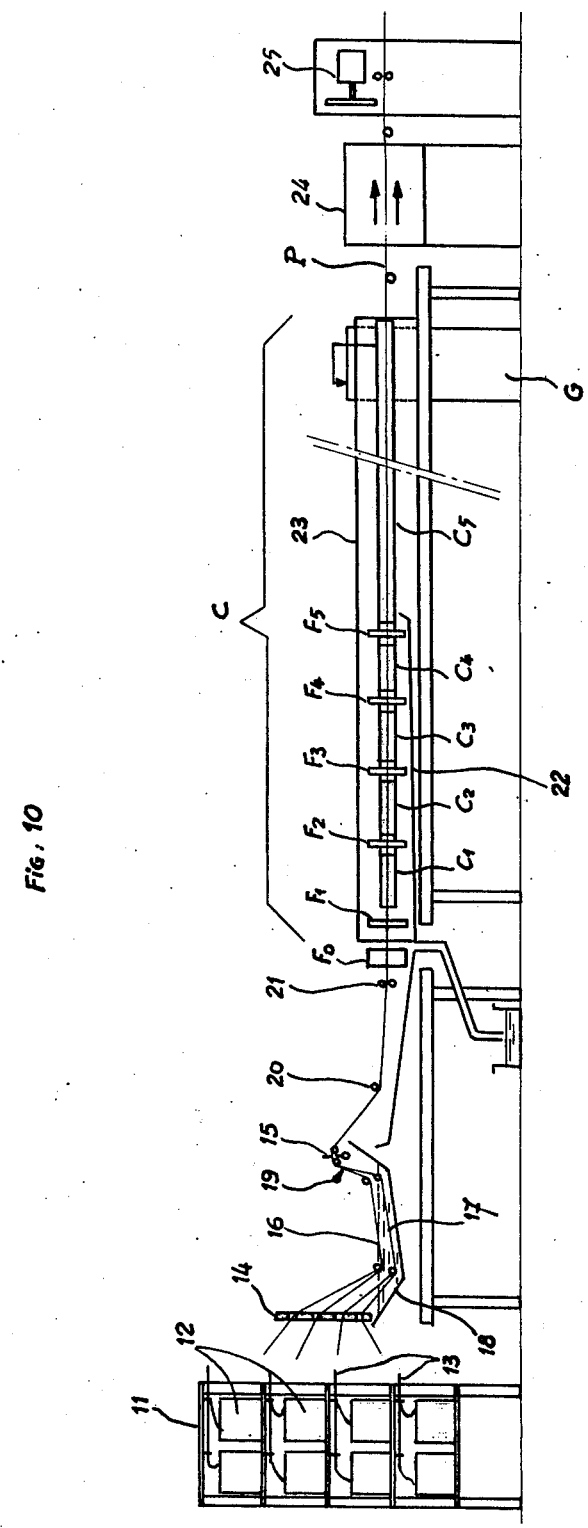
FIG. 10 is a vertical schematic view of an installation for producing fiber reinforced resin structures.

The curve shown in the graph of FIG. 1 illustrates generally the distribution of electrical potential HF, and therefore the strength of the electrical field, that exists in a heater having a length of λ/4 as a function of the distance L from the entrance to the heater; the left-hand side of the graph represents the entrance to the heater. The standing wave form shown is achieved by the use of a heater having a length corresponding to one quarter the wavelength of the applied current, and by supplying the current to the heater electrodes at the downstream end of the heater.

FIG. 2 illustrates the relationship of the temperature of the resin-impregnated material $\theta$ as a function of the distance L from the entrance to the heater. $\theta_o$ is the initial temperature of the material. $\theta_1$, located at a point of inflection of the curve, is the minimum temperature at which the polymerization reaction is initiated; $\theta_1$ differs for different types of resins. The maximum temperature, $\theta_2$, is the maximum exothermal point. Near this point, heat developed by the polymerization reaction attains a maximum.

FIG. 3 schematically represents a forming and dielectric heating apparatus according to the invention. This apparatus comprises dies $F_2$, $F_3$ placed in a heater C having a series of straight electrode sections $C_1$, $C_2$, $C_3$, that are electrically connected by conductive bridges $A_1$, $A_2$. The dies $F_1$, $F_2$ are placed between electrode sections and aligned with the bridges $A_1$, $A_2$ respectively. The resin-impregnated material first passes through an entry die $F_1$ at the entrance to the heater, traverses the forming and heating assembly comprised of dies $F_1$, $F_2$ electrode sections $C_1$, $C_2$, $C_3$, and bridges $A_1$, $A_2$, and then passes out of the assembly in the form of a structure P from the last electrode section $C_3$. As shown in FIG. 3 and also in FIG. 4, the bridges $A_1$, $A_2$ are formed of rigid metallic pieces, preferably rounded, that extend around or over the dies. The height "l" preferably is the same as the height of the electrode sections $C_1$, $C_2$, $C_3$ that the bridges connect. The minimum distance "d" between a bridge and the metallic die must be such as to avoid electrical discharge between the bridge and the die. The assembly comprised of the electrode sections $C_1$, $C_2$, $C_3$ and the bridges $A_1$, $A_2$, constitute a rigid electrode of which there are two that are symmetrical with respect to the axis of the dies, thus forming a heater C. Each electrode is similar to an electrical line having a constant impedence characteristic.

The electrodes of the heater C are formed of electrically-conductive materials such as copper, brass, or aluminum. The opposed electrodes form an open line one quarter the wavelength of the frequency of the applied current. The current is fed to the electrodes at the downstream end of the line by a high frequency generator G. The distance "d'" between the electrodes defines the electrical field to which the impregnated material is subjected. The distance d' is adjustable. The heating rate obtained in a dielectric heating arrangement is inversely proportional to the distance between electrodes and therefore, the distance d' is maintained as small as possible. Of course, the lower limit of distance d' is limited by the dielectric properties of air and the limit is set so as to avoid corona discharge between the electrodes. Of course, the heating produced by dielectric loss is directly proportional to the square of the voltage potential across the electrodes and there must be a balance between the potential of the field and the distance d'. The distance d' must also be compatible with the characteristics of the high frequency generator used.

The distance separating two consecutive dies is chosen so that there is no deformation of the material that extends between the two dies. However, it should be noted that the position of the last die in the heater is governed by the position of the temperature $\theta_2$, the previously described maximum exothermal point. More particularly, the resin-impregnated material should meet the last die while the resin at the surface of the material is still between the gel phase and the hardening phase; this change of state of the resin occurs near the maximum exothermal point.

To improve the surface finish of the structure produced, it is advantageous that the last die be longer than the preceding dies so that a maximum exothermal phase is finished by the time the material leaves the exit of the die.

According to another feature of the invention, the last die can be formed of an insulating material that is resistant to abrasion and that has a loss factor on the order of $1-1.5 \times 10^{-6}$, for example, certain ceramics. In this case, it is not necessary to place such a die between bridge elements. The die is heated by reason of dielectric loss and this die functions as a heating die that accelerates the polymerization of the resin on the surface of the structure being formed.

As pointed out earlier, the electrical potential between electrodes, and therefore the electrical field, is highest at the entrance to the heater. However, it is essential to avoid all sparks capable of disturbing the work and all risk of corona discharge that, in the presence of very highly flammable synthetic resins, is capable of provoking fires. These risks are reduced by eliminating all possible angles from the constituent element of the heater and by highly polishing the heater surfaces. To further reduce the risk of corona discharge, it is possible to insulate the surfaces of the electrodes as illustrated in FIG. 5. The inside surfaces of the electrode surfaces 1 and 1' carry layers 2, 2' of an insulating material having a low dielectrical loss factor, for example, PTFE. Also a cover 3, formed of PTFE, and having openings 4 to allow the escape of solvent vapors contained in the resin, can be provided. By use of this insulation, the heating efficiency is increased and for a given power input, the speed with which the resin-impregnated material passes through the heater can be increased. The elements 2 and 3 comprise thermal insulation that considerably diminishes heat loss by conduction and convection and avoids chilling of the skin of the structure in the course of polymerization by contact with air. The layers 2 and 2' also avoid corona discharge between the electrode sections 1 and 1' and thus serve the dual role of thermal insulation and electrical insulation. The thickness of the layers 2, 2' must be such that there is sufficient clearance between the impregnated material and the layers so that clogging and frictional wear of the PTFE are avoided.

Referring to FIG. 6, and die $F_2$ comprises a steel plate 5 provided with a calibrated orifice 6, the profile of which corresponds to that of the structure to be produced. The dimensions of the calibrated orifices of the successive dies can be identical or successively slightly smaller in order to prevent sudden expression of the resin. A chamfer or a "rounding off" 7 has the advantage of preventing deterioration of the outer surface of the structure produced as it enters the dies. The dies are fixed on the frame of the installation by mounting holes 8. It should be noted that, within the heater, the dies are only bearing points for the structure P.

In order to obtain shaped open structures, for example, such as those in the form of a U, a die having an orifice 6 as shown in FIG. 7 is used. FIG. 8 shows a modification for making this form of structure, which modification comprises addition of a supplementary piece 9, of dielectric material, that comprises a counterform. The permittivity of the dielectric material forming the piece 9 preferably has a valve close to that of the structure being formed so that an approximately constant electric field in a plane perpendicular to the axis of the heater is obtained. There must be sufficient clearance between the structure and the form 9 to prevent wear. The piece 9 can in like manner, be connected to the electrodes.

The system of dies described for obtaining structures in the form of a rod can also be used to make hollow structure. To accomplish this, a floating core 10 is placed in the heater, passing through the axes of successive metallic dies as illustrated in FIG. 9.

FIG. 10 shows, in vertical section, an installation for obtaining structures from thermosetting resin reinforced with glass fiber roving, according to the inventive method disclosed.

The installation of FIG. 10 comprises a creel 11 in which are placed windings 12 of roving 13. The rovings pass through a guide system, for example, a plate 14 with guides, the guides being arranged in a series of lines spaced at equal distances. After the rovings leave the plate 14, the rovings are drawn through a comb 15, the teeth of which hold the rovings separated.

An impregnation tank 18, containing the resin, is placed between the guide plate 14 and the comb 15. The rovings extending between the plate 14 and comb 15 are divided into two parallel groups by means of two metal frames 16 and 17 that are capable of moving vertically. Movement of the frames 16 and 17 into the bath immerses the two groups of rovings to achieve the best impregnation.

A wiper 19 comprising two rubber blades, is located before the separator comb 15 for eliminating a part of the excess resin entrained by the rovings. After leaving the comb 15, the impregnated rovings pass through two additional wiping or drying stages 20 and 21 that are comprised of simple wipers. The rovings are assembled in the form of a strand by the aid of a die $F_o$ that is also a preforming die that serves to form the outline of the profile.

The impregnation system described above can be advantageously replaced by resin injection at the die $F_o$. In this case, the injection and the preforming are effected simultaneously.

The preformed rod, that results from the passage of the impregnated material through dies $F_o$, $F_1$, then passes into the forming and polymerization section. The polymerization is obtained by dielectrical heating loss resulting from the high frequency current applied to the electrodes of heater C that form a line of about ¼ wavelength of the applied current. The electrodes are supplied with current by a high frequency generator G and the electrodes comprise a series of electrode sections $C_1$, $C_2$, $C_3$, $C_4$, $C_5$, that are electrically connected. The electrical connections to the electrodes from the generator G are located at the downstream end of the heater adjacent the exit of the rod P from the heater. Forming dies $F_2$, $F_3$, $F_4$, $F_5$, are located between the electrode sections in a longitudinal sense. The last electrode section $C_5$ is longer than the preceeding sections in order to coincide with the conditions concerning the positioning of the last die $F_5$, as previously explained.

A pan 22 receives excess resin that is expressed from the impregnated material by the drying devices 20 and 21 and the dies.

The electrodes of the heater C and the dies $F_1$, $F_2$, $F_3$, $F_4$, $F_5$, are mounted on a frame 23. The work is moved through the processing steps by a driving device 24, located downstream of the heater, which engages the manufactured structure P, for example, with driven rollers. Downstream of the driving device 24 is a cutting device 25 with a diamond or other type of saw for cutting the structure to predetermined lengths. As shown in FIGS. 11, 12 and 13, insulators 26 are intercallated between the frame 23 and electrode sections 1'; these electrode sections are supplied with high frequency current by generator G and are connected to each other by conductive bridges $A_1$, $A_2$, $A_3$, and $A_4$. For manufacturing simplicity, each of the electrode sections 1 is grounded by direct mounting on the frame.

A capacitive volt meter 27 measures the potential across electrode section $C_1$, so that the voltage and therefore the heat produced by dielectric loss can be determined and set at a desired value.

The other numbered elements appearing in FIGS. 12 and 13 have already been discussed in connection with previous embodiments and these elements carry the same reference numerals as in the previously-discussed embodiments. Therefore, no further explanation is believed necessary.

EXAMPLE

The following is an example of a process utilizing the apparatus illustrated in FIGS. 10-13 for producing a rod or structure of cylindrical cross-section that is composed of textile glass fiber reinforcement and polyester resin.

The reinforcement is in the form of a roving comprising 16 strands of 160 tex, each strand comprising 800 filaments, the diameter of the filaments being about 10 microns.

The designation of the reinforcement is the following:

"Stratifil" *: EC 10 2560 P25 (160)
E: Nature of the glass
C: Continuous fiber
10: Diameter of the unitary filament in microns
2560: Proportion of the silver in tex (1 tex = 1g/1000m)
P25: Polyvinyl acetate based sizing on the glass
(160): Proportion of the unitary strand in tex
*A proprietary designation of Saint-Gobain Industries.

The number of rovings of "Stratifil" is chosen so that the weight percentage of reinforcement in the finished product, for a rod diameter of 20 mm, is about 70%, this percentage corresponding to about 150 rovings of Stratifil. The composition of the impregnation resin in parts by weight is the following:

| | | | |
|---|---|---|---|
| "Rhodester 1108" | 100 | pp | } polyester resins |
| "Rhodester 1102" | 15 | pp | } Rhone-Poulenc |
| Styrene | 10 | pp | |
| "Lucidol B 50" | 2.3 | pp | } catalyzers (peroxides) |
| "Trigonox K 70" | 0.4 | pp | } Nourylande |

The 150 rovings of Stratifil are placed on the creel 11 and are fed through a 500 × 300 mm plate 14 that carries 150 eyelets. After leaving the plate 14, the rovings are fed through comb 15 that maintains separation between the rovings.

The length of the impregnation tank 18 is about 1 m.

After leaving the comb 15, the rovings are gathered in the preforming die $F_o$ and formed into a cylindrical rope-like strand having a diameter of 25 mm. The distance separating the comb 15 from the die $F_o$ is about 2 meters.

The dies, including entry die $F_1$, are formed of semi-hard steel plates 2 that are 80 × 80 × 15 mm in size and that have orifices with the following diameters:

$F_1$ = 20.5 mm
$F_2$ = 20.3 mm
$F_3$ = 20.1 mm
$F_4$ and $F_5$ = 20 mm

The distance between a die and a corresponding bridge is 50 mm. The electrode sections are formed from electrolytic coppers bars having a cross-section of 50 × 3 mm. The lengths of these sections are as follows:

$C_1 = C_2 = C_3 = C_4 = 50$ cm

With a wave length of 22 meters and a longitudinal distance between electrode sections being 12 cm, the value of the length of electrode sections $C_5$ is calculated as follows:

$$C_5 = (\lambda/4) - (50 \times 4) - (12 \times 4) = 302 \text{ cm}$$

The distance separating electrodes is 30 mm. The electrodes are covered with 3 mm of PTFE and the resulting usable distance is thus 24 mm.

A Brown Bovery type 4 C2 (4KW) generator, adjusted to a frequency of 13.56 MHz, supplied current to the electrodes of the heater.

With a potential of 7 to 8 kV at the entrance to the heater, a high processing speed on the order of 130 cm/mn was used. This processing speed could be increased by the use of a higher potential.

Macrophotographs of parts of the rod obtained show, despite the high fabrication speed, the absence of cracks, fissures, bubbles or faults that are likely to cause rapid degradation of the performance of the product.

Also, the method is highly reliable; one test of the method as equipment as described above continued for 60 hours without the need for replacing the dies in the heater.

I claim:

1. Apparatus for producing continuous shaped structures from resin impregnated material comprising a dielectric heater having opposed electrodes extending between an entrance and outlet of the heater, a preforming means located upstream of the heater for preforming the impregnated material, forming means comprising a succession of short dies located within the dielectric heater, drive means for moving the resin impregnated material through the preforming means, the dielectric heater, and the forming means, generating means operatively associated with said electrodes for generating a high frequency current, and means for supplying the high frequency current from the generating means to the electrodes of the dielectric heater in a manner so that the maximum value of the resulting electrical field is located adjacent the entrance of the dielectric heater.

2. Apparatus as in claim 1, wherein at least one of the dies is metallic.

3. Apparatus according to claim 1 wherein the electrodes of the dielectric heater are of a length of about one quarter the wavelength of the high frequency current generated by the generating means.

4. Apparatus according to claim 3, wherein the supply means is affixed to the electrodes near the outlet of the dielectric heater.

5. Apparatus according to claim 1, wherein the dielectric heater comprises a succession of electrode sections electrically connected by bridges between them and wherein the forming means comprises metallic dies placed between electrode sections at the locations of the said bridges.

6. Apparatus according to claim 5 wherein each electrode section is composed of two rectilinear plates and wherein the bridges are rigid metallic parts which "step over" the dies.

7. Apparatus according to claim 5 wherein the last electrode section of the dielectric heater has a longer length than the preceeding ones.

8. Apparatus according to claim 5 wherein the electrode sections carry insulation layers of a material with low dielectrical loss.

9. Apparatus according to claim 8, wherein the layers are of a thickness such that there is clearance between the layers and the structure while the structure is being formed.

10. Apparatus according to claim 8 wherein the dielectric heater includes a cover of a material having low dielectrical loss.

11. Apparatus according to claim 10 wherein the cover includes a depending portion of dielectrical material.

12. Apparatus according to claim 5 characterized in that the dies are composed of metallic plates, each having a calibrated orifice corresponding to the structure to be obtained.

13. Apparatus according to claim 5 wherein the forming means includes a floating core passing through the axes of the successive dies.

14. Apparatus according to claim 1 wherein the last die of the succession of dies is composed of a material resistant to abrasion and having a relatively high dielectrical loss.

15. Apparatus as in claim 14 wherein the last die is composed of a ceramic material.

* * * * *